United States Patent
Yamamoto

(10) Patent No.: US 10,452,291 B2
(45) Date of Patent: Oct. 22, 2019

(54) CONTROL DEVICE, STORAGE DEVICE AND CONTROL METHOD

(71) Applicant: NEC Corporation, Minato-ku, Tokyo (JP)

(72) Inventor: Masahiko Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 305 days.

(21) Appl. No.: 15/451,637

(22) Filed: Mar. 7, 2017

(65) Prior Publication Data

US 2017/0277458 A1    Sep. 28, 2017

(30) Foreign Application Priority Data

Mar. 25, 2016    (JP) .................... 2016-061235

(51) Int. Cl.
| | | |
|---|---|---|
| G06F 12/00 | (2006.01) | |
| G06F 3/06 | (2006.01) | |
| G06F 12/02 | (2006.01) | |
| G06F 11/14 | (2006.01) | |

(52) U.S. Cl.
CPC .......... *G06F 3/0622* (2013.01); *G06F 3/0617* (2013.01); *G06F 3/0632* (2013.01); *G06F 3/0659* (2013.01); *G06F 3/0688* (2013.01); *G06F 11/14* (2013.01); *G06F 11/1458* (2013.01); *G06F 12/0238* (2013.01); *G06F 12/0246* (2013.01)

(58) Field of Classification Search
CPC .... G06F 3/0622; G06F 3/0617; G06F 3/0632; G06F 3/0659; G06F 3/0688; G06F 3/0689; G06F 11/14; G06F 11/1458; G06F 12/0238; G06F 12/0246
See application file for complete search history.

(56) References Cited

U.S. PATENT DOCUMENTS

| | | | |
|---|---|---|---|
| 2010/0005228 A1 | 1/2010 | Fukutomi et al. | |
| 2014/0032834 A1* | 1/2014 | Cudak ................. | G06F 11/1092 711/114 |
| 2017/0168896 A1* | 6/2017 | Karrotu ............... | G06F 11/1076 |

FOREIGN PATENT DOCUMENTS

| | | |
|---|---|---|
| JP | 2010-003150 A | 1/2010 |
| JP | 2010-015516 A | 1/2010 |
| JP | 2015-060346 A | 3/2015 |

* cited by examiner

*Primary Examiner* — Shawn X Gu

(57) ABSTRACT

A control device of the present invention includes a management unit configured to manage each mode of a plurality of SSDs (Solid State Drives) included in a storage, an area reservation unit configured to reserve an update data area in a free space of the SSDs, the mode of the SSDs being in readable/writable mode, a saving unit configured to control writing to the storage in such a way that data relating to a request for writing to one of the SSDs in read-only mode is stored in the update data area, and a read control unit configured to control whether the data is read from the SSD in the read-only mode or the update data area based on the mode of the SSD and presence/absence of update for the data.

7 Claims, 13 Drawing Sheets

Fig.3

| ORIGINAL ADDRESS | PARITY DATA? | UPDATED OR NOT | WRITE DESTINATION |
|---|---|---|---|
| A1 | 0 | 1 | A1' |
| B1 | 0 | 0 | — |
| C1 | 0 | 1 | C1' |
| D1 | 0 | 1 | D1' |
| E1 | 0 | 0 | — |
| F1 | 0 | 0 | — |
| Gp | 1 | 0 | — |
| H1 | 0 | 0 | — |
| I1 | 0 | 0 | — |
| J1 | 0 | 0 | — |
| : | : | : | : |

CONTROL DEVICE, STORAGE DEVICE AND CONTROL METHOD

This application is based upon and claims the benefit of priority from Japanese Patent Application No. 2016-061235, filed on Mar. 25, 2016, the disclosure of which is incorporated herein in its entirety by reference.

TECHNICAL FIELD

The present invention relates to a control device, a storage device, a control method and a computer readable recording medium.

BACKGROUND ART

Japanese Patent Application Laid-open Publication No. 2010-15516 (hereinafter referred to as PTL1) discloses a data control device of storage system and the like which may reduce risk of data loss. The data control device disclosed in PTL1 sets a difference in frequency of writing data to each of a plurality of nonvolatile semiconductor storage devices, when the device determines that the difference in the frequency of writing data is required.

Japanese Patent Application Laid-open Publication No. 2010-3150 (hereinafter referred to as PTL2) discloses a data management method, a memory controller and the like for flash memories which may extend life of flash memories by reducing the number of rewrites. The memory controller disclosed in PTL2 performs control in a manner to acquire difference data required for rewriting original data already written in a storage device and only to write the differential data to the storage device.

Japanese Patent Application Laid-open Publication No. 2015-60346 discloses a technology relating to a disk array device and the like which may prevent loss of information even when some failure occurs in a Redundant Arrays of Inexpensive Disks (RAID) 0 system having no redundancy.

SUMMARY

An example object of the invention is to provide a storage control device and the like that may enable efficient resource utilization.

A control device in one aspect of the present invention includes a management unit configured to manage a mode of each of a plurality of Solid State Drives (SSDs) included in a storage, an area reservation unit configured to reserve an update data area in a free space of the SSD in readable/writable mode, a saving unit configured to control writing in such a way that data relating to a request for writing to one of the SSD in read-only mode is stored in the update data area, and a read control unit configured to control reading in such a way that data is read out from the SSD in the read-only mode or the update data area depending on the mode of the SSD and presence/absence of update for the data to be read out.

A storage device in one aspect of the present invention includes a storage including a plurality of Solid State Drives (SSDs), and a controller including a management unit configured to manage a mode of each of the plurality of SSDs included in the storage, an area reservation unit configured to reserve a update data area in a free space of the SSD in readable/writable mode, a saving unit configured to control writing in such a way that data relating to a request for writing to one of the SSD in read-only mode is stored in the update data area, and a read control unit configured to control reading in such a way that the data is read out from the SSD in the read-only mode or the update data area depending on the mode of the SSD and presence/absence of update for the data to be read out.

A control method for a mode of each of a plurality of Solid State Drives (SSDs) in one aspect of the present invention includes reserving an update data area in a free space of the SSDs in readable/writable mode, controlling writing in such a way that data relating to a request for writing to one of the SSD in read-only mode is stored in the update data area, and controlling reading in such a way the data is read out from the SSD in the read-only mode or the update data area depending on the mode of the SSD and presence/absence of update for the data to be read out.

BRIEF DESCRIPTION OF THE DRAWINGS

Exemplary features and advantages of the present invention will become apparent from the following detailed description when taken with the accompanying drawings in which:

FIG. 3 is a diagram illustrating an example of an update management table used in the control device in the first example embodiment of the present invention.

EXEMPLARY EMBODIMENT

Next, a detailed explanation will be given of a example embodiment with reference to the drawings. In the example embodiment of the present invention, each components of a control device and the like represents a block of a functional unit. Each components of the control device and others may be implemented by any combination of hardware and software including, for example, a CPU (Central Processing Unit), a memory, and a program or the like loaded on the memory.

Further, there are a variety of modified examples for implementing the control device and others. A part or all of the components of the control device and others may be implemented by general-purpose or dedicated circuitries such as a processor or the like, or by any combination of them. Such a circuitry may be constructed by a single chip or by a plurality of chips connected with each other via a bus.

Figure 1:
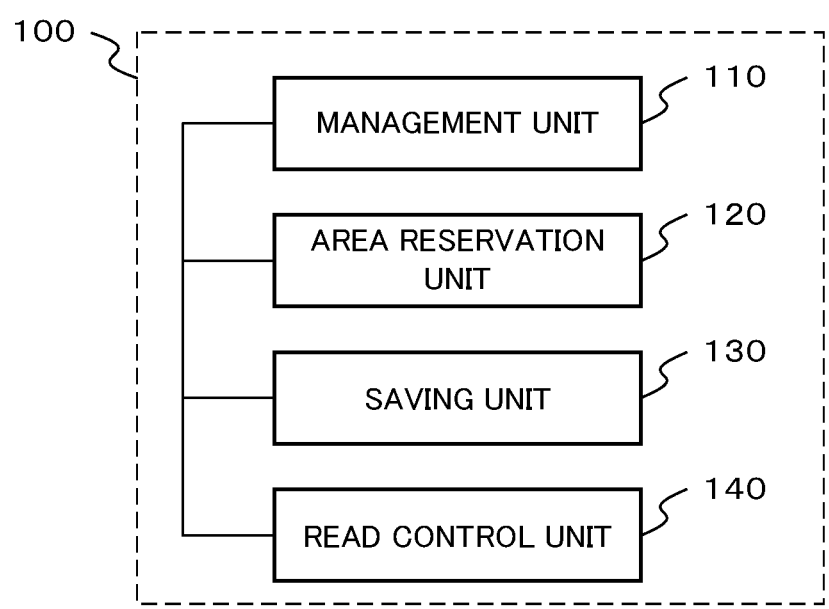
FIG. 1 is a diagram illustrating a configuration of a control device in a first example embodiment of the present invention.

A first example embodiment of the present invention will be described first. As illustrated in FIG. 1, a control device 100 in the first example embodiment of the present invention includes a management unit 110, an area reservation unit 120, a saving unit 130 and a read control unit 140.

The management unit 110 manages each mode of a plurality of SSDs included in a storage 160. The area reservation unit 120 reserves an update data area in a free space of the SSDs, the mode of the SSDs being in readable/writable mode. The saving unit 130 controls writing to the storage in such a way that data relating to a request for writing to one of the SSDs in read-only mode is stored in the update data area. The read control unit 140 controls reading from the storage in such a way that the data is read from the SSD in the read-only mode or the update data area based on the mode of the SSD and presence/absence of update for the data.

Figure 2:
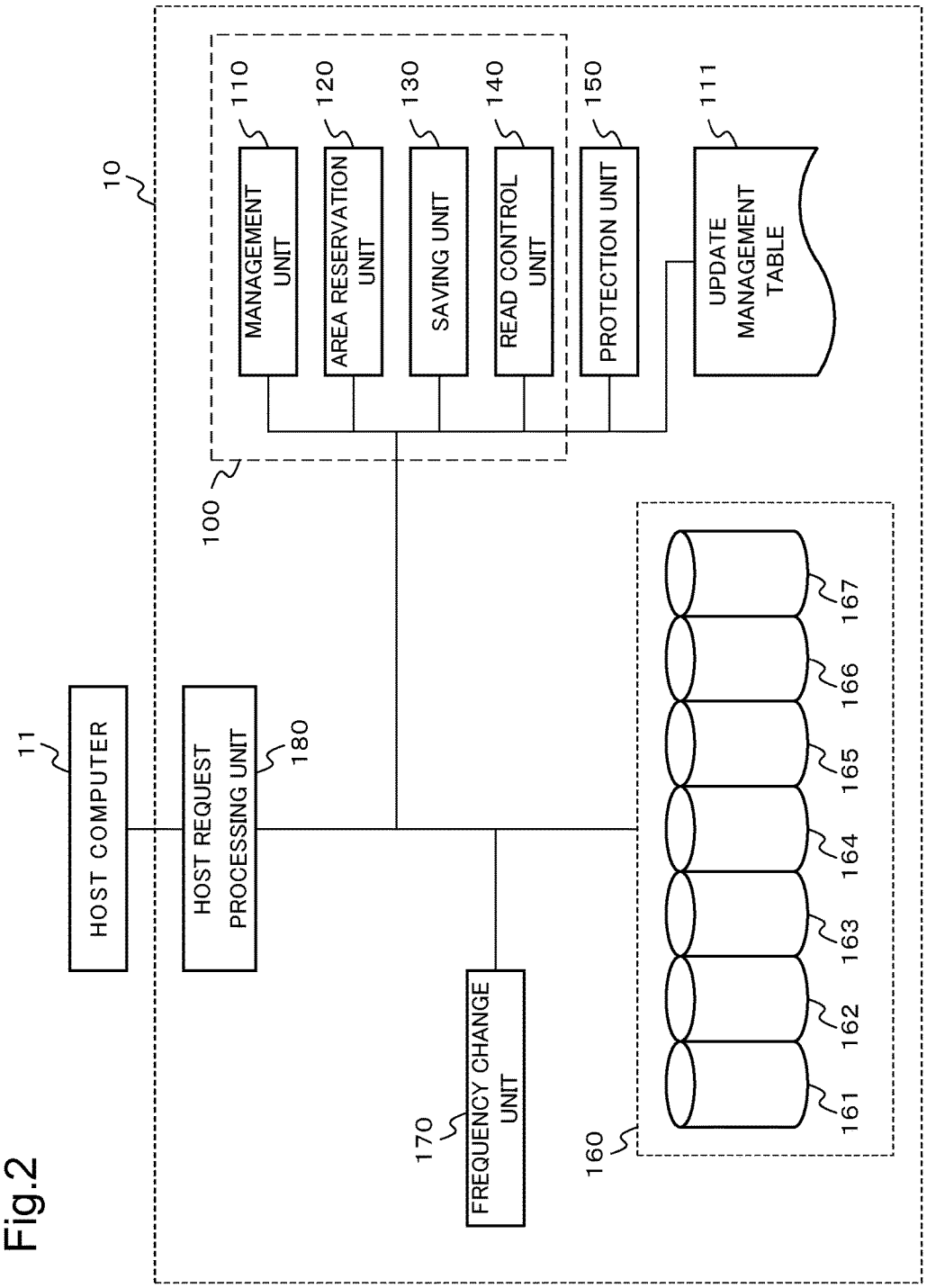
FIG. 2 is a diagram illustrating a configuration of a storage device in the first example embodiment of the present invention.

FIG. 2 illustrates an example of a storage device 10 including the control device 100. The storage device 10 includes the control device 100, a protection unit 150, a storage 160, a host request processing unit 180 and a frequency change unit 170. In addition, the storage unit 160 may further store an update management table 111 which records a state of data stored in an update data area. In the example illustrated in FIG. 2, the storage 160 includes seven SSDs, that is, SSDs 161 to 167. The number of SSDs included in the storage 160 is not limited to this example. In the present example embodiment, each of the SSDs 161 to 167 is a storage device using flash memories, for example. It is assumed that each of the SSDs 161 to 167 is normally both readable and writable, and after a large number of writings, writing to each of them may become impossible and thus each of them may become only readable. Here, the storage 160 may include one or more storage drives except SSD which may still be readable even after disablement of writing.

Next, a description will be given to each of the components of the control device 100 and the storage device 10 in the present example embodiment.

The management unit 110 manages a mode for each of the SSDs constituting the storage 160. Specifically, the management unit 110 manages each SSD to be managed such as each of the SSDs 161 to 167, in a manner to determine the mode to be either in a mode representing that the SSD is both readable and writable (hereinafter referred to as readable/writable mode) or in a mode representing that the SSD is only readable and not writable (hereinafter referred to as read-only mode). There is no particular limitation on a form for representing the above-described modes, and any other form capable of distinguishing whether each SSD is in the read-write mode or in the read-only mode can be used.

The management unit 110 monitors whether the number of writing to each of the SSDs 161 to 167 has reaches a predetermined upper limit respectively. When the number of writing to of any one of the SSDs 161 to 167 has reached the predetermined upper limit value, the management unit 110 changes the mode of the SSD, to which the number of writing has reached the upper limit, from the readable/writable mode to the read-only mode. When each of the SSDs 161 to 167 any mechanism of managing their own mode and monitoring whether the number of writing reaches the upper limit value respectively, the management unit 110 may acquire, for example, notification from each of the SSDs 161 to 167 representing that the mode has been changed.

The area reservation unit 120 reserves an update data area in a free space of the SSDs in the readable/writable mode. Specifically, when the mode of any one of the SSDs 161 to 167 is changed to the read-only mode, the area reservation unit 120 reserves the update data area in a free space in the other SSDs remaining in the readable/writable mode. The updated data area is an area for storing a data which updates a data already stored in the SSD with read-only mode. In the following descriptions, it is assumed that the update data area is reserved in a free space of all the other SSDs remaining in the readable/writable mode. However, the update data area may be reserved in a free space area in some of the other SSDs remaining in the readable/writable mode. An area reserved in advance, or an area reserved in accordance with a necessity may be used as the free space.

The saving unit 130 controls writing of data to the SSDs included in the storage 160 in such a way that data relating to a request for writing to the SSD in the read-only mode is stored in the update data area. In other words, when there occurs a request for writing data to the SSD in the read-only mode among the SSDs 161 to 167, a data relating to the request is stored in the update data area instead of the SSD in the read-only mode.

The read control unit 140 controls reading data from the storage 160 in such a way that the data is read from the SSD in the read-only mode or the update data area, based on the mode of the SSD and presence/absence of update for the data. That is, when data stored in the SSD in the read-only mode has been unupdated, the read control unit 140 controls reading data in such a way that the data is read from the SSD in the read-only mode. When the data stored in the SSD in the read-only mode has been updated, the read control unit 140 reads the data which is updated from the update data area.

In a case that reading of data stored in the SSD in the read-only mode is requested, if the data recorded in the SSD in the read-only mode has been unupdated, the data may still be used. Accordingly, the read control unit 140 reads the data from the SSD in the read-only mode. In contrast, if the data stored in the SSD in the read-only mode has been updated, the data stored in the SSD in the read-only mode is previous data that is not updated. Accordingly, the read control unit 140 controls the reading of data in such a way that the updated data is read from the update data area.

By thus controlling, when at least one of the SSDs 161 to 167 becomes unwritable and is set to the read-only mode, it may still be possible to use the SSDs effectively as read-only SSDs.

As described above, the state of data recorded in the SSD having been set to be in the read-only mode and the state of data recording in the update data area are recorded in the update management table 111. FIG. 3 illustrates an example of the update management table 111. For each piece of data stored in the SSD set to be in the read-only mode, the update management table 111 includes information on the original address, whether the data is parity data of RAID 5, whether the data has been updated and an address of the destination for writing updated data when the data is updated. The components of the control device 100 and the protection unit 150 and the like, which will be described below, executes processes with referring to the information recorded in the update management table 111 as necessary.

The protection unit 150 generates parity for data stored in the update data area, thereby protecting the data. The parity is generated by calculating an exclusive-OR (XOR) of data to be saved.

The storage 160 is an element for storing data in the storage device 10. As described above, the storage 160 includes, for example, a plurality of SSDs or the like. In the example illustrated in FIG. 2, the storage 160 includes the seven SSDs 161 to 167. The SSDs may be in a RAID configuration. In the present example embodiment, it is assumed that RAID 5 is constructed by the SSDs included in the storage 160.

The frequency change unit 170 changes the frequencies of writing to each of the SSDs 161 to 167 respectively. When RAID 5 is configured, the frequencies of writing to each of the SSDs 161 to 167 are estimated to be almost the same. Accordingly, in this case, there arises a possibility that the number of writing to each of the SSDs 161 to 167 reaches the upper limit around the same time.

The frequency change unit 170 changes the frequencies of the writing to each of the SSDs 161 to 167 by controlling parity allocation amount of the RAID to each of the SSDs 161 to 167, for example. The frequency change unit 170 changes the frequencies of the writing on the basis of, for example, the method described in PTL1 or the like. By thus changing the frequencies, it is avoided that the number of the writing to each of the SSDs 161 to 167 reaches the upper limit around the same time The host request processing unit 180 controls reading of data stored in the storage 160 and writing of data to the storage 160, in response to a request from the host computer 11.

Figure 4:
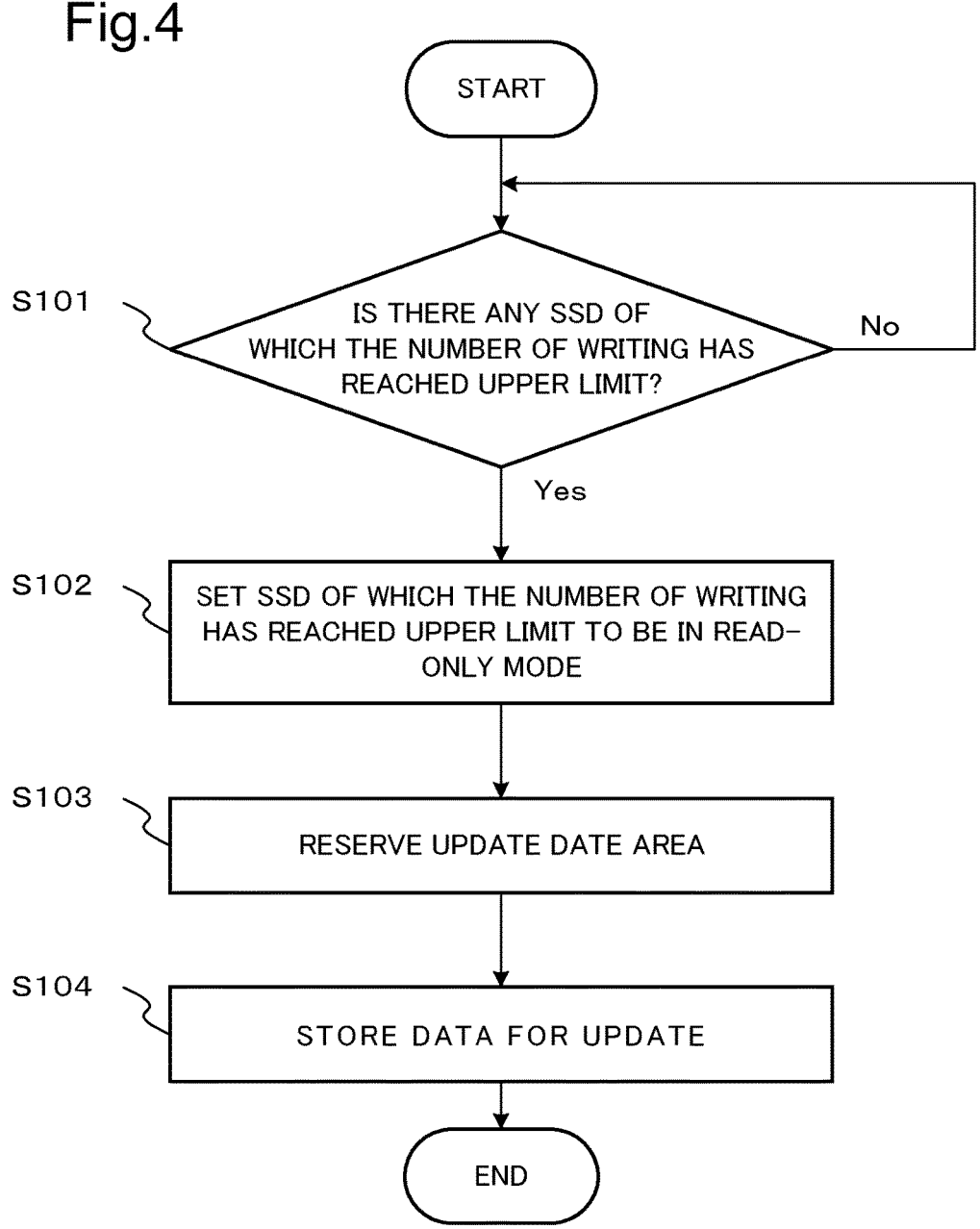
FIG. 4 is a flowchart illustrating operation in writing, of the control device in the first example embodiment of the present invention.

Next, using flowcharts illustrated in FIGS. 4 and 5, an outline of an operation of the control device 100 in this example embodiment will be described. First, using the flowchart illustrated in FIG. 4, writing operation of the control device 100 will mainly be described.

The management unit 110 checks whether there is any SSD of which the number of writing has reached the upper limit, the SSD is among the SSDs 161 to 167 which is included in the storage unit 160 (step S101). This check is executed each time writing to any of the SSDs 161 to 167 is executed, such as a case where the number of writing to the SSD has not been reached to the upper limit (No in step S101).

Here, it may be assumed a case where each of the SSDs 161 to 167 is provided with a mechanism of managing whether the number of writing to each of the SSD has reached the upper limit. In such a case, the management unit 110 may check whether the number of writing to any one of the SSDs 161 to 167 included in the storage 160 reaches the upper limit by acquiring notification from each of the SSDs 161 to 167 representing that the mode has been changed.

If there is an SSD among the SSDs 161 to 167 to which the number of writing has reached the upper limit (YES at the step S101), the management unit 110 changes the mode of the SSD to the read-only mode (step S102).

Then, the area reservation unit 120 reserves an update data area in a free space of SSDs, among the SSDs 161 to 167, which remain in the readable/writable mode (step S103).

When a request occurs for writing to the SSD to which the number of writing has reached the upper limit, the saving unit 130 controls the writing in such a way that a data relating to the request is stored in the data area (step S104). In this case, in order to ensure redundancy of the storage 160 as RAID 5, a process relating to protection of the data stored in the data area, for example, generation of parity by the protection unit 150, is carried out as necessary.

Figure 5:
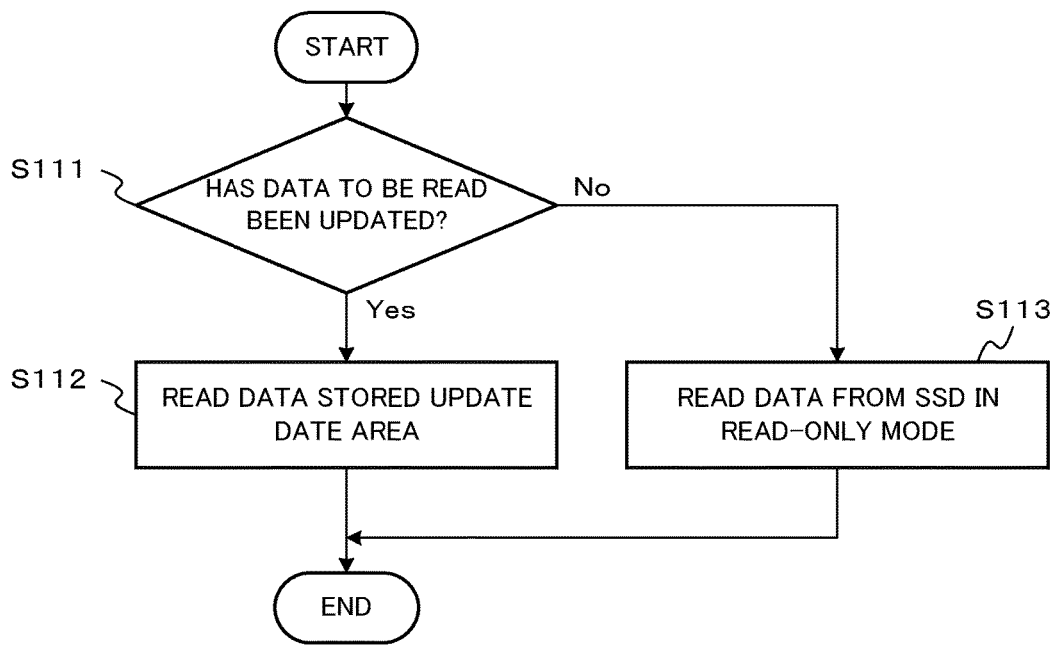
FIG. 5 is a flowchart illustrating operation in reading, of the control device in the first example embodiment of the present invention.
Figure 6:
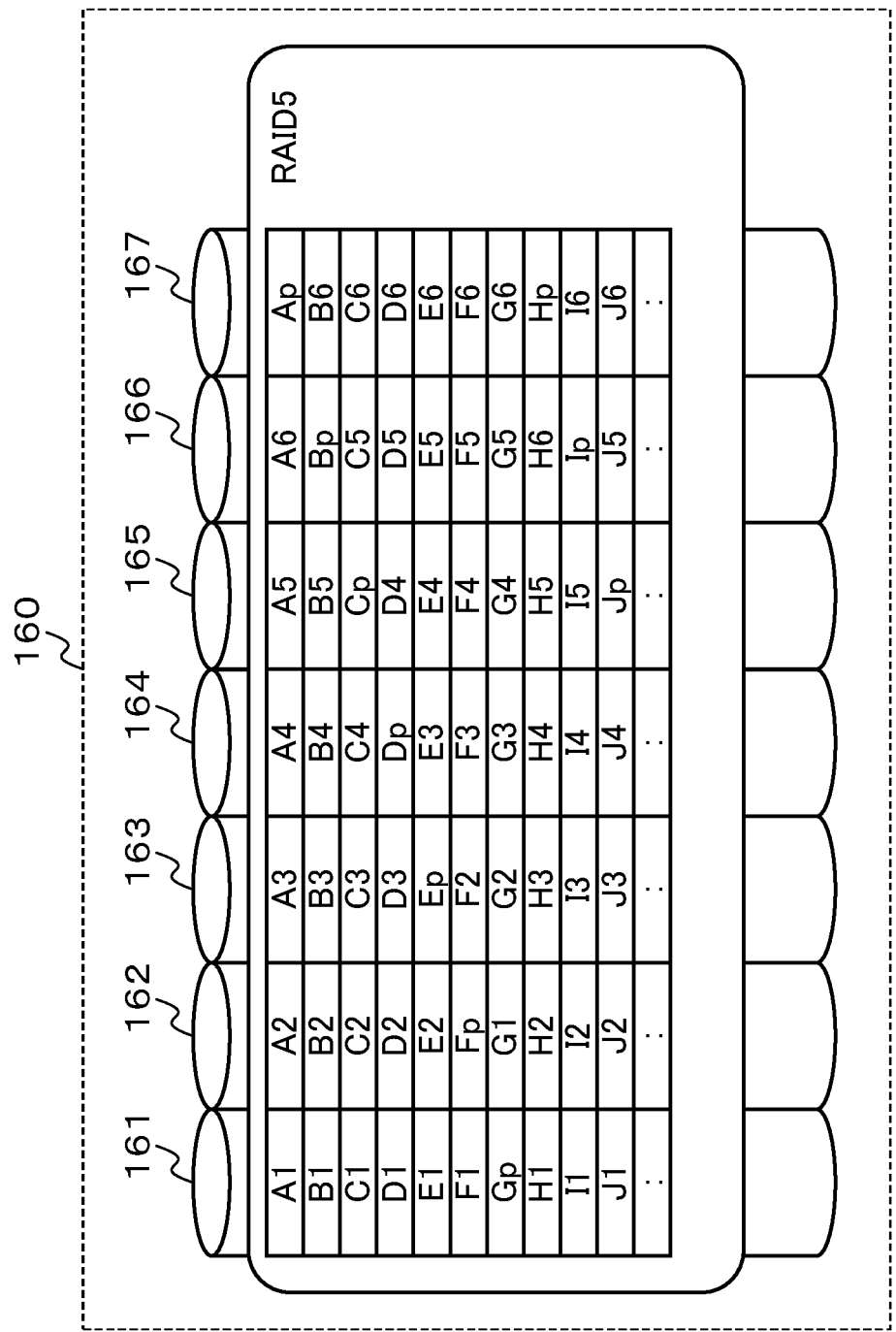
FIG. 6 is a diagram illustrating a state of a storage unit in an example of operation of the control device and storage device in the first example embodiment of the present invention.

Next, using the flowchart illustrated in FIG. 5, reading operation of the control device 100 will mainly be described. The flowchart illustrated in FIG. 5 illustrates an outline of operation of the control device 100 when data is read from one or more SSDs in the read-only a mode, which are included in the storage 160.

The read control unit 140 determines whether the data to be read has been updated (step S111). The read control unit 140 performs the above-described determination by referring to the update management table 111 as appropriate.

When the data to be read has been updated (YES at the step S111), the read control unit 140 reads data stored in the update data area using information recorded in the update management table 111 (step S112).

If the data to read has not been updated (NO at the step S111), the read control unit 140 controls reading data in such a way that the requested data is read from the SSD in the read-only mode (step S113).

Next, with referring to diagrams illustrated in FIGS. 6 to 13, a specific example of the operation of the control device 100 and storage device 10 in the first example embodiment of the present invention will be described. In the following example of operation, it is assumed that a disk array of RAID 5 is constructed by the seven SSDs 161 to 167 in the storage 160. In addition, in the following diagrams, each of A1, A2, . . . B1, B2, . . . , J5 and J6 depicted in the SSDs 161 to 167 represents a block of data stored in the storage 160. Each of Ap, Bp, . . . , and Jp represents parity data of RAID 5. More specifically, Ap represents parity data for A1, A2, . . . , and A6.

Figure 7:
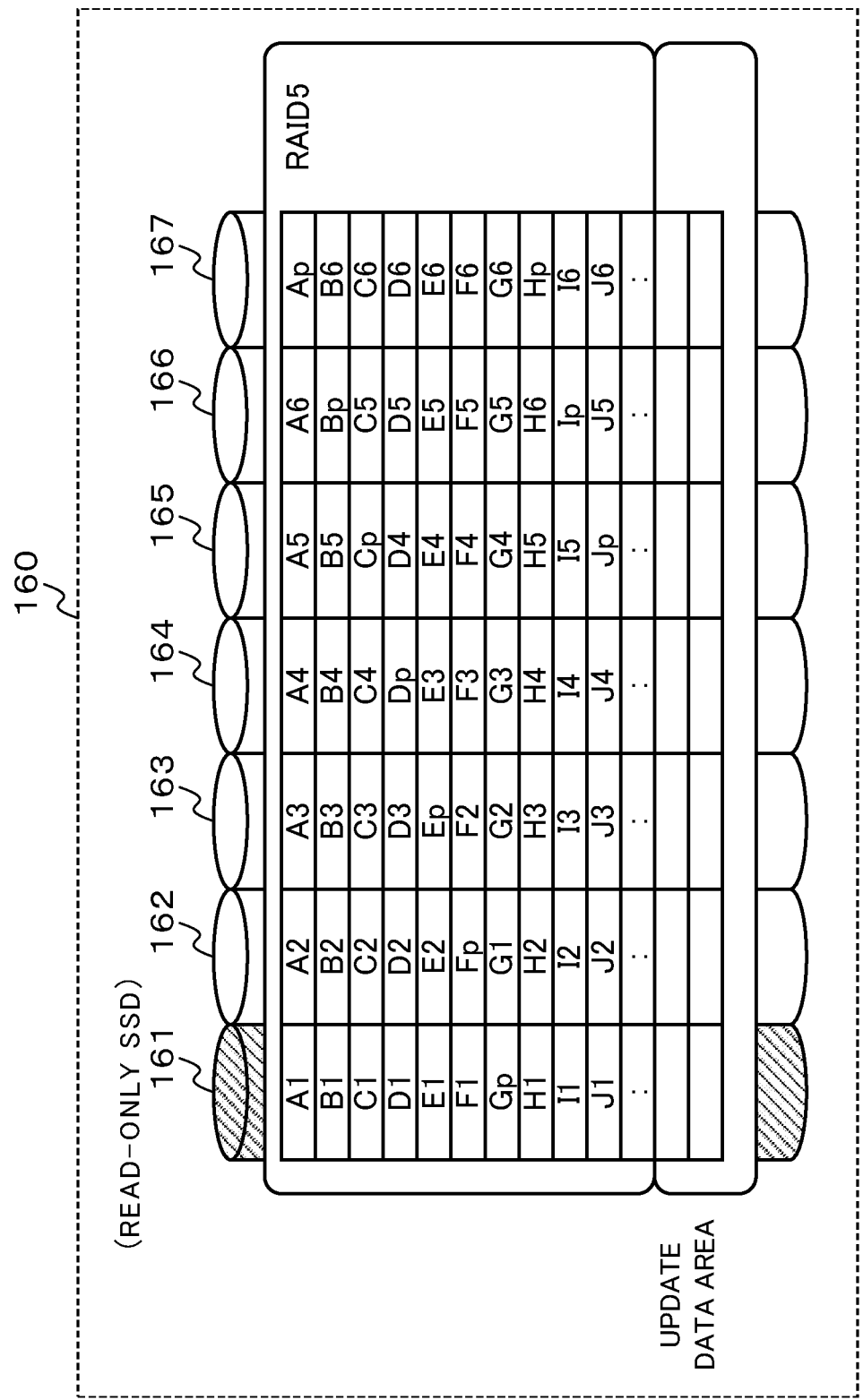
FIG. 7 is a diagram illustrating an example of a state of the storage unit when an update data area is reserved, in the example of operation of the control device and storage device in the first example embodiment of the present invention.

In the present example, it is assumed a case that the number of writing to the SSD 161 has reached the upper limit. In this case, the management unit 110 changes the mode of the SSD 161 to the read-only mode. In addition, the area reservation unit 120 reserves the update data area in each of the SSDs 161 to 167. FIG. 7 is a diagram illustrating an example of a state of the storage 160 where the data area is reserved.

In this case, data arrangement within the data area may be carried out by the saving unit 130 with refereeing to a physical address of the storage unit 160 on demand, in accordance with the information recorded in the update management table 111. Such arrangement may improve usage efficiency of free spaces in the storage 160.

Figure 8:
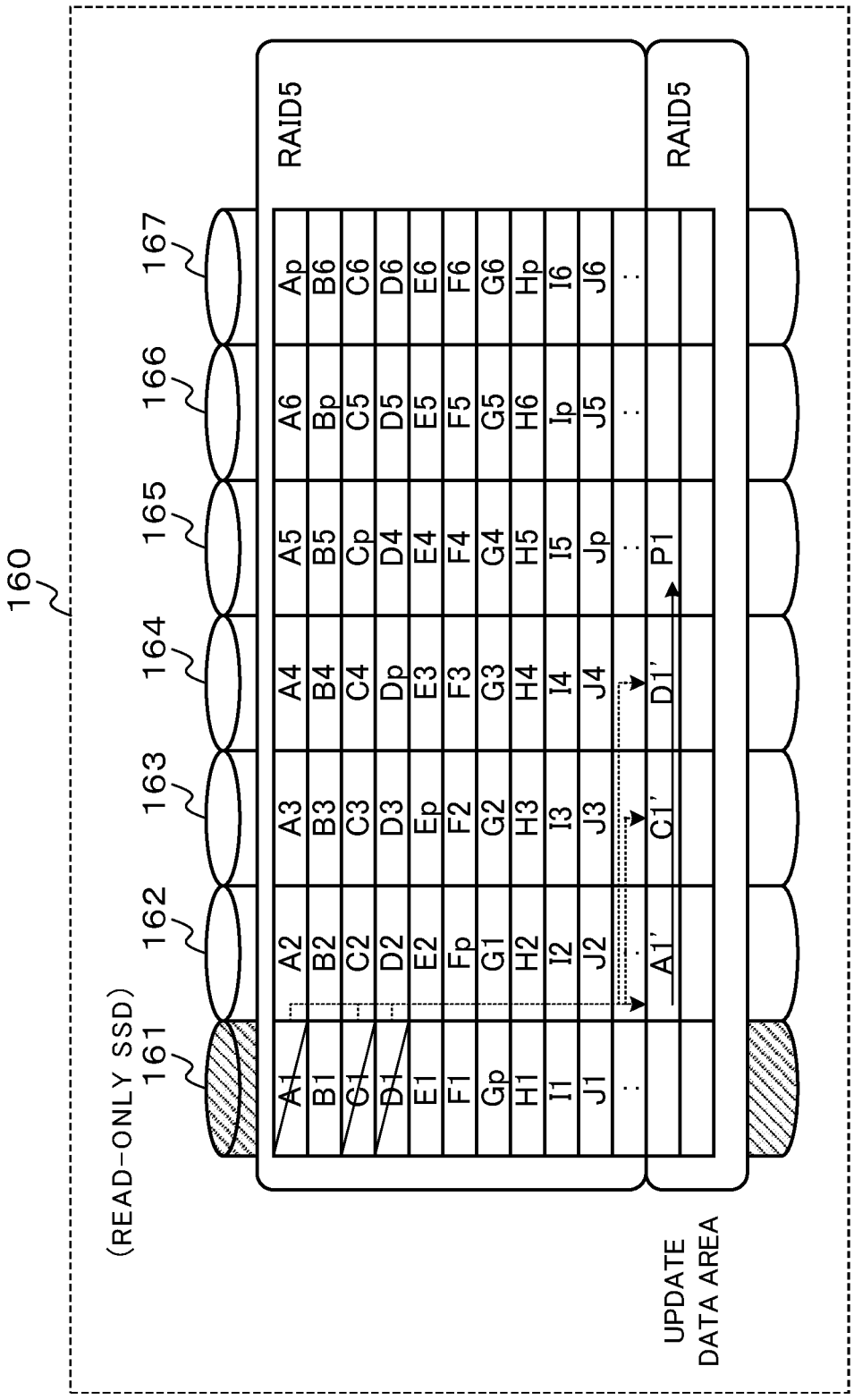
FIG. 8 is a diagram illustrating an example of a case where data is written in the update data area, in the example of operation of the control device and storage device in the first example embodiment of the present invention.

When it is necessary to update data stored in the SSD 161 in the read-only mode, the saving unit 130 stores a block of data which updates the data stored in the SSD 161 to the update data area reserved in the manner as described above. FIG. 8 illustrates an example of a case where the block of data have been stored in the update data area. In the example illustrated in FIG. 8, A1, C1 and D1 stored in the SSD 161 are to be updated. In this case, in accordance with the information recorded in the update management table 111, the saving unit 130 controls writing in a manner that blocks of data A1', C1', and D1' each of which are data for update A1, C1 and D1 respectively are stored in the update data area.

The protection unit 150 generates parity for the blocks of data which are updated. In this case, the protection unit 150 generates parity P1 by calculating XOR of A1', C1' and D1'. Thus, a RAID 5 configuration is constructed for the blocks of data stored in the update data area reserved in the SSDs 162 to 165.

Here, the stripe width of such a RAID 5 configuration for data stored in the update data area may be changed in accordance with the amount of data stored in the update data area. In the present example of operation, the stripe width may be extended from the SSD 162 to the SSD 167. In other words, the stripe width may be extended up to a maximum number of SSDs in the readable/writable mode. The protection unit 150 regenerates the parity P1 when additional data is written to the update data area, that is, when the stripe width is extended.

Figure 9:
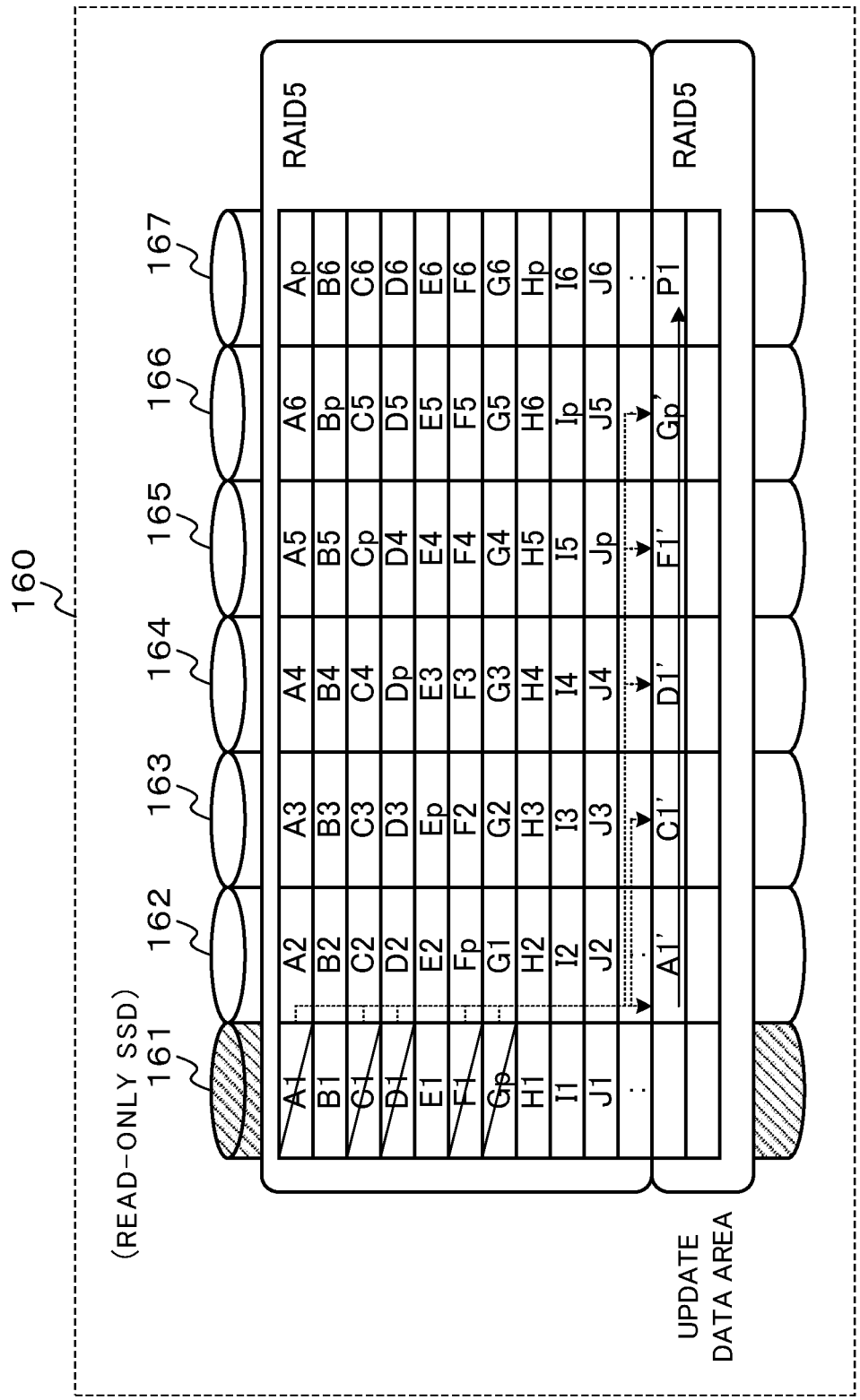
FIG. 9 is a diagram illustrating an example of a case where parity for the update data area is regenerated, in the example of operation of the control device and storage device in the first example embodiment of the present invention.
Figure 10:
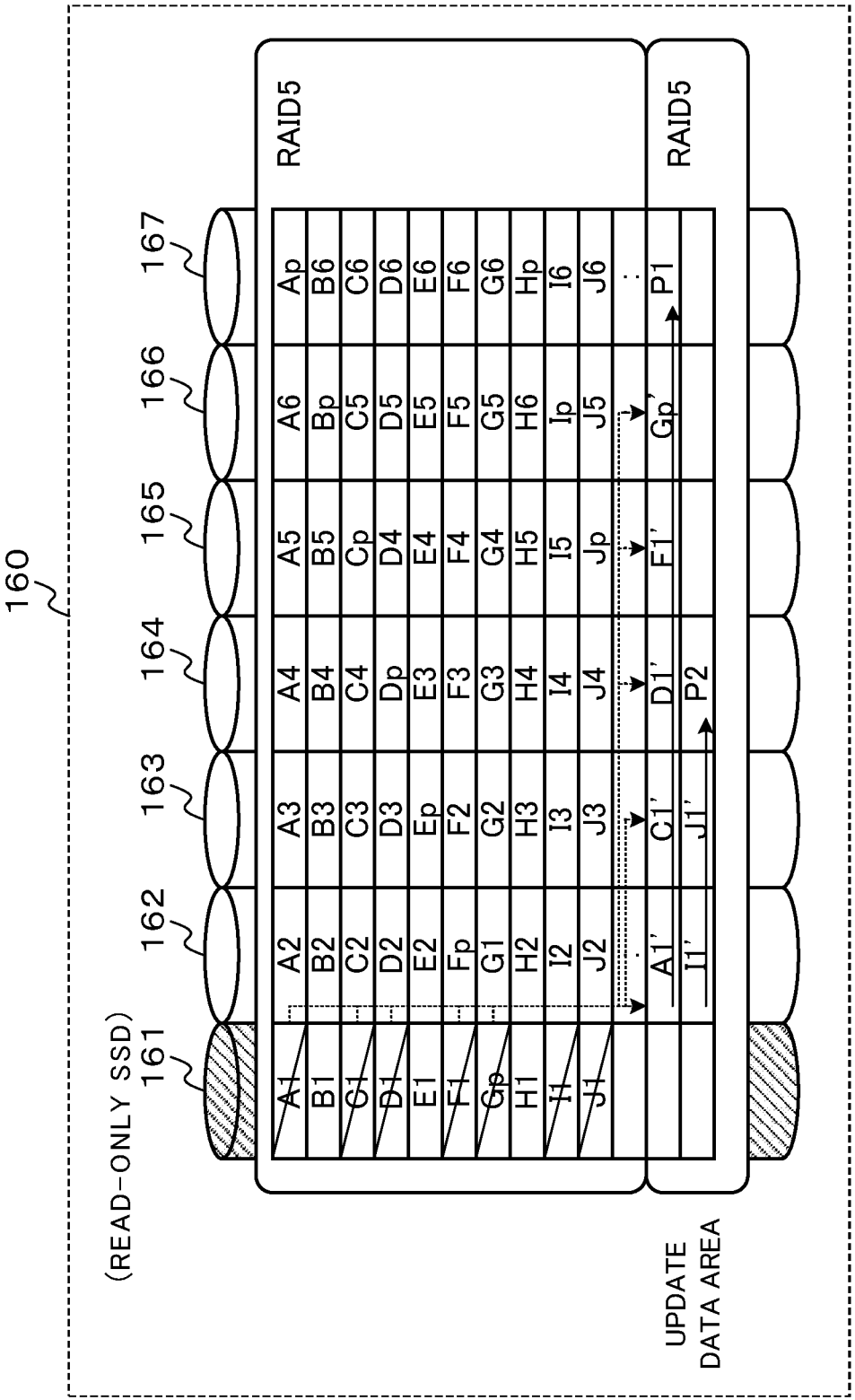
FIG. 10 is a diagram illustrating an example of a case where additional data is written to the update data area in the example of operation of the control device and storage device in the first example embodiment of the present invention.

FIG. 9 is a diagram illustrating an example of this case. In the example illustrated in FIG. 9, F1 and Gp stored in the SSD 161 are to be updated, and, accordingly F1' and Gp' are stored in the update data area. The protection unit 150 regenerates the parity P1 for A1', C1', D1', F1' and Gp'. Data for update can be stored efficiently in terms of capacity since the protection unit 150 regenerates parity as described above FIG. 10 illustrates an example of a case where data is additionally stored in the update data area. In the example illustrated in FIG. 10, I1 and J1 stored in the SSD 161 are to be updated, and accordingly, IF and J1' are stored in the update data area. The protection unit 150 generates parity P2 for IF and J1'.

Figure 11:
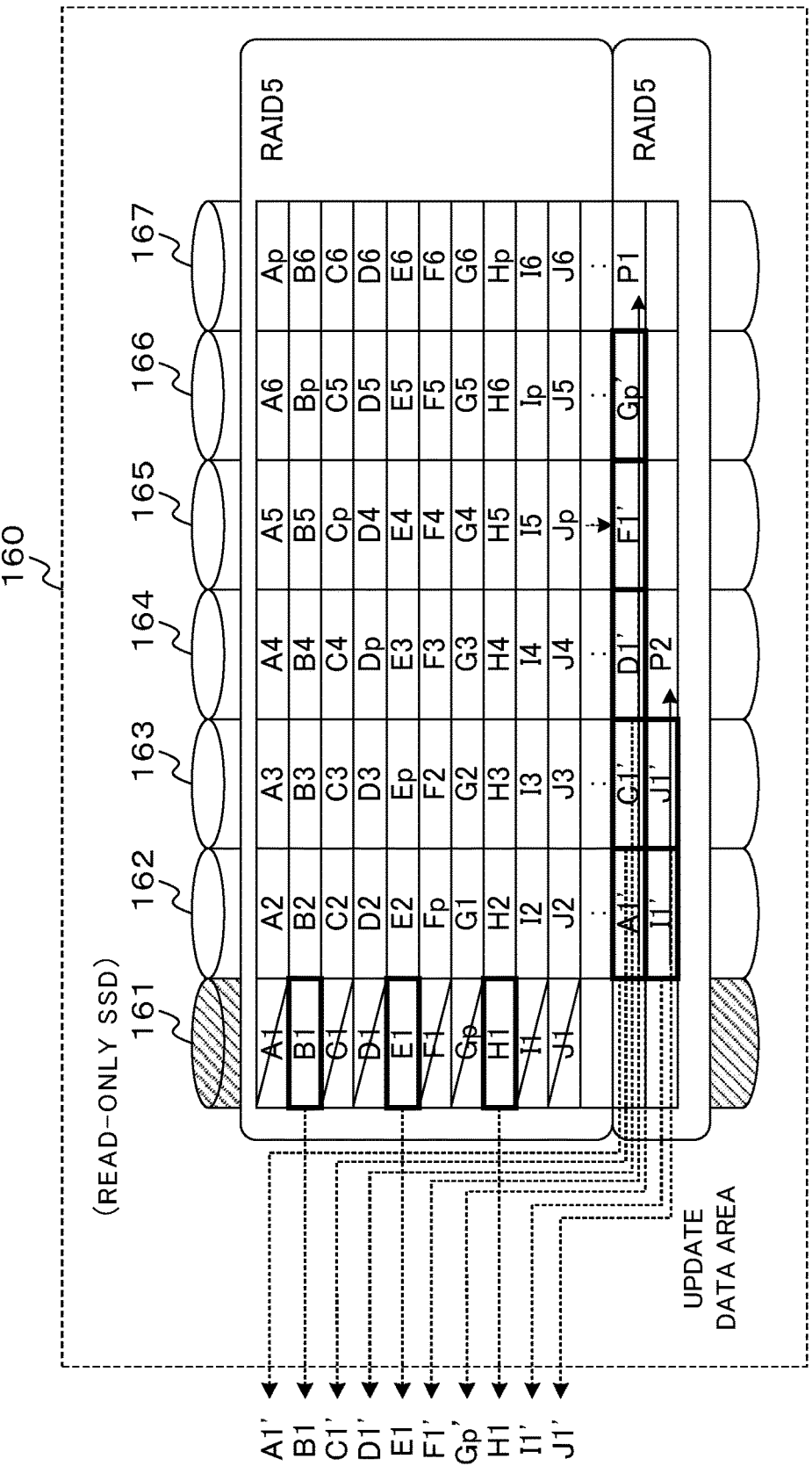
FIG. 11 is a diagram illustrating an example of a case where data is read in the example of operation of the control device and storage device in the first example embodiment of the present invention.

Next, a case for reading data from the storage 160 will be considered. When a request for reading data is received from, for example, the host computer 11 via the host request processing unit 180, the read control unit 140 checks whether the data to be read has been updated, based on the information recorded in the update management table 111. FIG. 11 illustrates an example of reading data from the storage 160.

In the example, when A1, A2, . . . , A6 and Ap are blocks of data to be read, A1 has been updated with A1'. That is, A1' has been stored in the update data area. Accordingly, the read control unit 140 reads A1' from the update data area.

On the other hand, when B1, B2, . . . , B6 and Bp are blocks to be read in this example, B1, stored in the SSD 161 which is in the read-only mode, has not been updated. Accordingly, the read control unit 140 reads B1 from the SSD 161.

Next, a case where any of the SSDs 161 to 167 included in the storage 160 fails will be considered. In this case, it is assumed that a new SSD 168 is provided and thus RAID 5 configuration is reconstructed. In the present example of operation, the case where any of the SSDs 161 to 167 included in the storage 160 fails indicates a state where both writing to and reading from the any of the SSDs 161 to 167 becomes impossible.

When any of the SSDs 161 to 167 fails, the management unit 110 determines whether the SSD which is failed is in the read-only mode, with referring to the information recorded in the update management table 111 as necessary.

Figure 12:
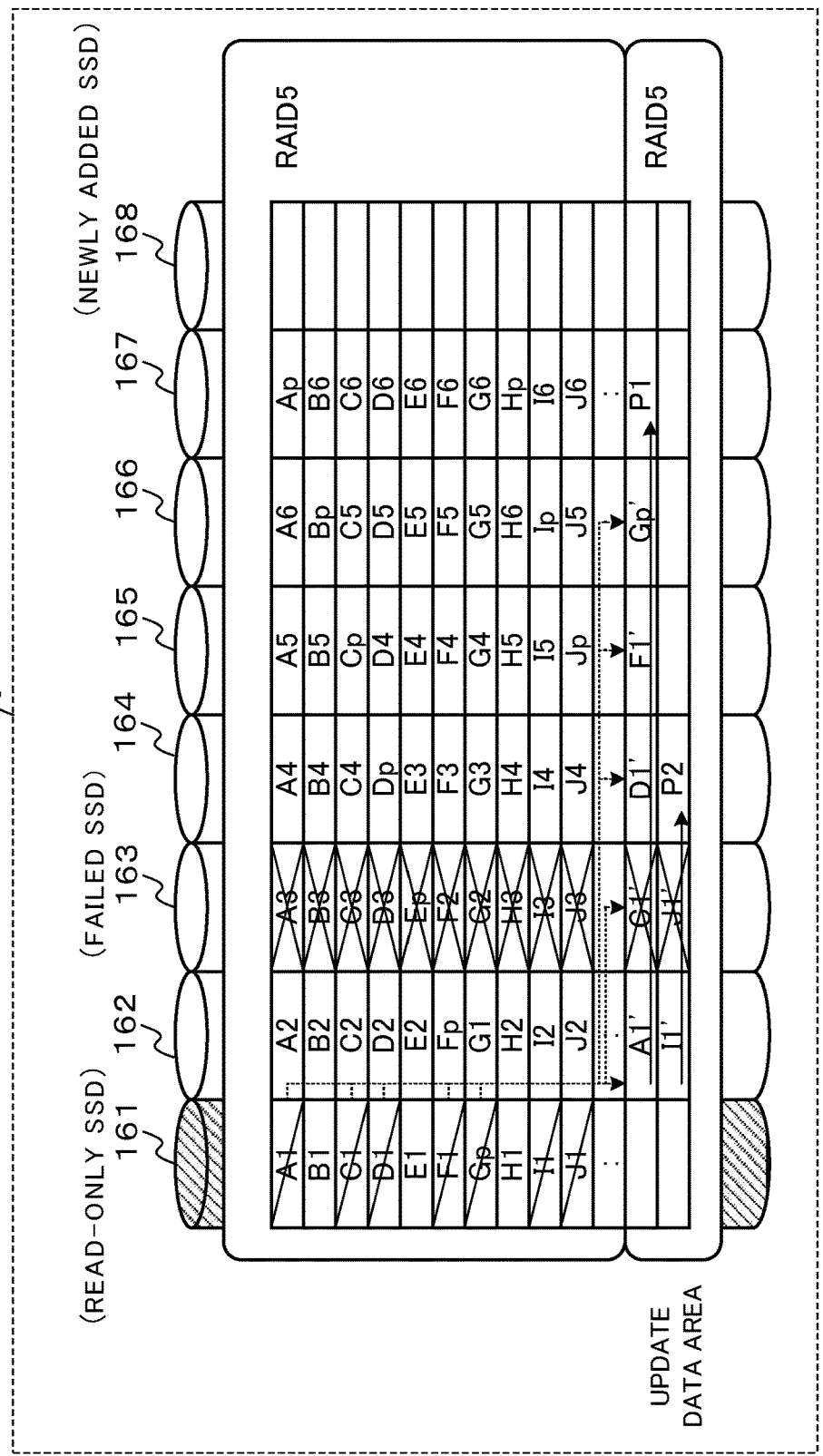
FIG. 12 is a diagram illustrating an example of a case where an SSD (Solid State Drive) fails in the example of operation of the control device and storage device in the first example embodiment of the present invention.

FIG. 12 is a diagram illustrating an example of RAID 5 reconstruction in a case that the SSD 163 having been in the readable/writable mode fails. In this case, when a block of data stored in the SSD 161 is a data other than parity data, the RAID 5 configuration is reconstructed using the block of data stored in the SSD 161. For example, when restoring A3 which is stored in the SSD 163, A1 which is stored in the SSD 161, A2, A4, A5, A6 and Ap stored in the SSD 162 and the SSDs 164 to 167 respectively are used.

In this case, however, if the block of data stored in the SSD 161 is parity data, data stored in the update data area is used for restoring A3 instead of using the block of data stored in the SSD 161. In other words, in the example illustrated in FIG. 12, Gp' stored in the update data area is used for restoring G2, along with G1, G3, G4, G5 and G6 stored in the SSD 162 and the SSDs 164 to 167 respectively.

In the example illustrated in FIG. 12, the update data area are reserved after the SSD 168 is provided. Further, C1' and J1' stored in the update data area in the SSD 163 are restored respectively using data P1 and P2 and other data stored in the data area.

Figure 13:
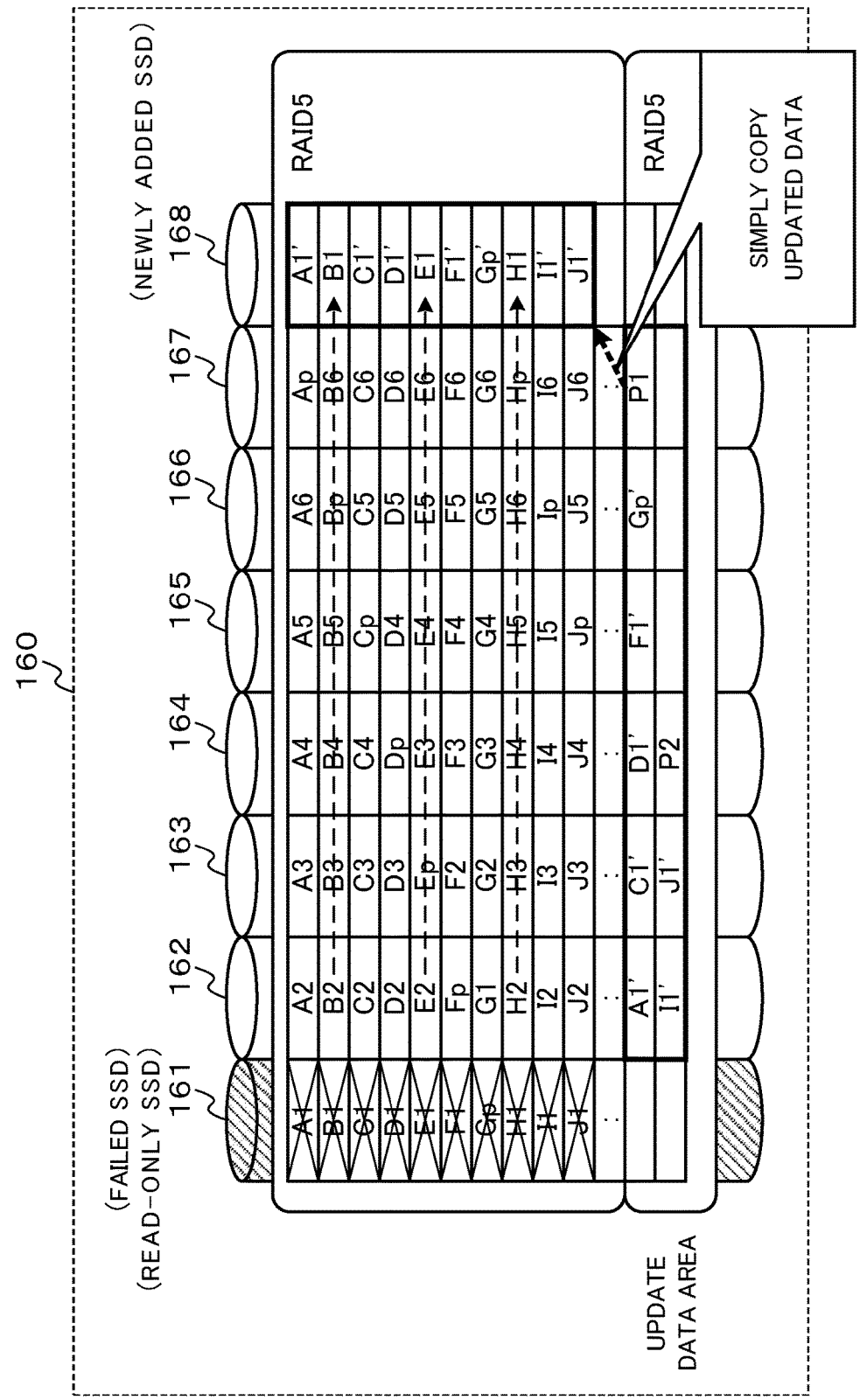
FIG. 13 is a diagram illustrating another example of a case where an SSD is in trouble in the example of operation of the control device and storage device in the first example embodiment of the present invention.

FIG. 13 is a diagram illustrating an example of RAID 5 reconstruction in a case where the SSD 161 having been in the read-only mode fails.

In the example, when none of the block of data stored in the SSD 161 is updated, in other words, when no updated data is stored in the data area, the management unit 110 restores data stored in the SSD 161 using blocks of data and parity stored in the SSDs 162 to 167. For example, B1 is restored using the blocks of data B2 to B6 and the parity data Bp stored in the SSDs 162 to 167 respectively, and then is stored to the SSD 168.

When any block of data stored in the SSD 161 is updated, in other words, when any data which is updated is stored in the update data area, the management unit 110 copies the data in the update data area to the SSD 168 and regenerates parity data, thereby reconstructing the RAID 5 configuration.

In this case, after the reconstruction, the update data area is unnecessary. Thus, the area reservation unit 120 releases the update data area. By thus managing the data area in the respective SSDs 162 to 167, it may become possible to reuse an area used for update data area. Further, in this case, the protection unit 150 can regenerate parity data on the basis of the original parity data and blocks of data stored in the update data area. Accordingly, it may become unnecessary, in regenerating parity data, to read data from every one of the SSDs 162 to 167. Further, when a data of block stored in the update data area is parity data, regeneration of parity data by the protection unit 150 may become unnecessary.

As a result, when reconstructing RAID 5 reconstruction in the storage device 10 which is controlled by the control device 100, the amount of access to the SSDs can be reduced in comparison with reconstruction process for a usual RAID 5 configuration. In other words, in the storage device 10 controlled by the control device 100, RAID 5 configuration can be reconstructed with a lighter load than in a storage with a usual RAID 5 configuration.

In addition, after the replacement of the SSD 161, which have failed as described above, usual RAID 5 operation can be carried out in the storage 160. That is, the storage device 10 controlled by the control device 100 may be operated recurrently and durably, while utilizing an SSD set to the read-only one.

As described above, the control device 100 in the first example embodiment of the present invention controls an operation of the storage 160 in such a way that when the mode of any of the SSDs included in the storage 160 of the storage device 10 is set to be in the read-only mode, the SSD is used as a read-only SSD. That is, a request for writing to the SSD set to the read-only mode is alternatively executed in such a way that a data relating to the request is stored in the update data area, which the area reservation unit 120 reserves, by the saving unit 130 in accordance with a determination result for the states of each of the SSDs by the management unit 110. In addition, a request for reading a data from the SSD in the read-only mode is executed by reading the data from either the SSD in the read-only mode or the update data area, depending on whether the data to read has been updated or not. As a result, the control device 100 in the present example embodiment enables continuing use of the SSD set to be a read-only SSD.

Further, in the case where a RAID 5 configuration is constructed in the storage 160 included in the storage device 10, RAID 5 configuration can be reconstructed using data stored in the update data area when an SSD included in the storage 160 and set to the read-only mode fails. Accordingly, the control device 100 or the storage device 10 in the present example embodiment enables reduction of a load required for RAID 5 reconstruction in the above-described case.

Therefore, the control device 100 in the present example embodiment enables efficient use of the resources included in the storage device 10.

SSD using nonvolatile semiconductor memories such as flash memories is becoming widespread as a storage device. Generally, nonvolatile semiconductor memories have a limited number of allowable writing. Thus, technology for extending the life span of SSD and for increasing the safety in terms of data retention have been studied.

There is a case such that an SSD with its number of writing having reached a certain number is set to be a read-only SSD. While it is impossible to write data to the SSD set to be a read-only one, data stored in such read-only SSD is still readable. However, use of a storage device such as an SSD having been set to be a read-only SSD is not necessarily considered in each of the patent literature as described above.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A control device comprising:
a management unit implemented at least in hardware and configured to manage a mode of each of a plurality of Solid State Drives (SSDs) included in a storage;
an area reservation unit implemented at least in the hardware and configured to reserve an update data area in a free space of the SSDs in readable/writable mode;
a saving unit implemented at least in the hardware and configured to control writing in such a way that data relating to a request for writing to a first SSD in read-only mode is stored in the update data area; and
a read control unit implemented at least in the hardware and configured to control reading in such a way that data is read out from the first SSD in the read-only mode or the update data area depending on the mode of the first SSD and presence/absence of update for the data to be read out,
wherein the read control unit controls the reading of data stored in the first SSD in the read-only mode in such a way that data is read from the first SSD in the read-only mode when the data to be read is not updated, and, data after update is read from the update data area when data to be read is updated.

2. The control device according to claim 1, wherein the saving unit generates parity for data stored in the update data area and stores the parity to the update data area.

3. The control device according to claim 2, wherein the saving unit regenerates parity for previously-stored data in the update data area and additionally-stored data to the update data area, and stores the parity that is regenerated to the update data area when the additionally-stored data is to the update data area.

4. The control device according to claim 1, wherein RAID (Redundant Arrays of Inexpensive Disks) 5 configuration is constructed by the plurality of the SSDs included in the storage, and
the management unit controls reconstruction of the RAID 5 configuration in such a way that the data stored in the update data area is copied to a newly-provided SSD when the first SSD in the read-only mode fails.

5. The control device according to claim 1, wherein Redundant Arrays of Inexpensive Disks (RAID) 5 configuration is constructed by the plurality of the SSDs included in the storage, and
the management unit controls reconstruction of the RAID 5 configuration in such a way that new data to be copied to a newly provided SSD is generated based on the data stored in the update data area and data stored in the first SSD in the read-only mode when the first SSD in the readable/writable mode fails.

6. A storage device comprising:
a storage including a plurality of Solid State Drives (SSDs); and
a controller including:
a management unit implemented at least in hardware and configured to manage a mode of each of the plurality of SSDs included in the storage,
an area reservation unit implemented at least in the hardware and configured to reserve a update data area in a free space of the SSDs in readable/writable mode,
a saving unit implemented at least in the hardware and configured to control writing in such a way that data relating to a request for writing to a first SSD in read-only mode is stored in the update data area, and
a read control unit implemented at least in the hardware and configured to control reading in such a way that data is read out from the first SSD in the read-only mode or the update data area depending on the mode of the first SSD and presence/absence of update for the data to be read out,
wherein the read control unit controls the reading of data stored in the first SSD in the read-only mode in such a way that data is read from the first SSD in the read-only mode when data to be read is not updated, and, data after update is read from the update data area when data to be read is updated.

7. A control method for a mode of each of a plurality of Solid State Drives (SSDs), comprising:
reserving an update data area in a free space of the SSDs in readable/writable mode;
controlling writing in such a way that data relating to a request for writing to one of the SSDs in read-only mode is stored in the update data area; and
controlling reading in such a way data is read out from a first SSD in the read-only mode or the update data area depending on the mode of the first SSD and presence/absence of update for the data to be read out,
wherein the read control unit controls reading of the data stored in the first SSD in the read-only mode in such a way that data is read from the first SSD in the read-only mode when data to be read is not updated, and, data after update is read from the update data area when data to be read is updated.

* * * * *